(12) United States Patent
McCormack et al.

(10) Patent No.: US 7,519,626 B2
(45) Date of Patent: Apr. 14, 2009

(54) MANAGEMENT OF CONTACTS IN A NETWORK OF CONTACT CENTERS

(75) Inventors: Tony McCormack, Galway (IE); Patrick Hession, Galway (IE); Arik Elbarse, Galway (IE); Neil O'Connor, Galway (IE)

(73) Assignee: Nortel Networks Limited, St. Laurent, Quebec (CA)

( * ) Notice: Subject to any disclaimer, the term of this patent is extended or adjusted under 35 U.S.C. 154(b) by 405 days.

(21) Appl. No.: 10/828,697

(22) Filed: Apr. 21, 2004

(65) Prior Publication Data

US 2005/0240594 A1 Oct. 27, 2005

(51) Int. Cl.
*G06F 17/30* (2006.01)
(52) U.S. Cl. ................................. 707/201; 707/103 R
(58) Field of Classification Search ............... 707/10, 707/102, 104.1, 103 R–103 Z, 201; 379/265.1, 379/265.11, 265.12, 266.01, 266.12; 709/223–226
See application file for complete search history.

(56) References Cited

U.S. PATENT DOCUMENTS

| | | | | | |
|---|---|---|---|---|---|
| 5,036,535 | A | * | 7/1991 | Gechter et al. | 379/265.11 |
| 5,291,551 | A | * | 3/1994 | Conn et al. | 379/266.09 |
| 5,450,482 | A | * | 9/1995 | Chen et al. | 379/230 |
| 5,878,130 | A | * | 3/1999 | Andrews et al. | 379/265.09 |
| 5,946,387 | A | * | 8/1999 | Miloslavsky | 379/265.12 |
| 6,118,865 | A | * | 9/2000 | Gisby | 379/265.02 |
| 6,535,601 | B1 | * | 3/2003 | Flockhart et al. | 379/266.01 |
| 6,636,599 | B1 | * | 10/2003 | Mullen | 379/265.05 |
| 6,650,748 | B1 | * | 11/2003 | Edwards et al. | 379/266.04 |
| 6,654,815 | B1 | * | 11/2003 | Goss et al. | 709/248 |
| 6,665,395 | B1 | * | 12/2003 | Busey et al. | 379/265.09 |
| 6,868,151 | B1 | * | 3/2005 | Brunner et al. | 379/219 |
| 6,937,715 | B2 | * | 8/2005 | Delaney | 379/265.09 |
| 7,023,979 | B1 | * | 4/2006 | Wu et al. | 379/265.11 |
| 7,068,642 | B1 | * | 6/2006 | Khan | 370/352 |
| 7,092,509 | B1 | * | 8/2006 | Mears et al. | 379/266.01 |
| 7,110,523 | B2 | * | 9/2006 | Gagle et al. | 379/265.01 |
| 7,110,525 | B1 | * | 9/2006 | Heller et al. | 379/265.11 |
| 7,117,244 | B2 | * | 10/2006 | Florman et al. | 709/203 |
| 2001/0055372 | A1 | * | 12/2001 | Glowny et al. | 379/88.22 |
| 2002/0035647 | A1 | * | 3/2002 | Brown et al. | 709/312 |
| 2003/0115353 | A1 | * | 6/2003 | Deryugin et al. | 709/231 |
| 2003/0185379 | A1 | * | 10/2003 | O'Connor et al. | 379/265.02 |
| 2003/0235290 | A1 | * | 12/2003 | Kepley | 379/266.08 |
| 2004/0039846 | A1 | * | 2/2004 | Goss et al. | 709/248 |
| 2004/0057569 | A1 | * | 3/2004 | Busey et al. | 379/265.09 |
| 2004/0062380 | A1 | * | 4/2004 | Delaney | 379/265.02 |
| 2004/0141508 | A1 | * | 7/2004 | Schoeneberger et al. | 370/401 |
| 2004/0193475 | A1 | * | 9/2004 | Hemm et al. | 705/9 |
| 2005/0002516 | A1 | * | 1/2005 | Shtivelman | 379/309 |
| 2005/0044129 | A1 | * | 2/2005 | McCormack et al. | 709/200 |
| 2005/0074112 | A1 | * | 4/2005 | Timmins | 379/218.01 |
| 2005/0129217 | A1 | * | 6/2005 | McPartlan et al. | 379/266.08 |
| 2006/0123060 | A1 | * | 6/2006 | Allen et al. | 707/200 |

* cited by examiner

*Primary Examiner*—Cheryl Lewis
(74) *Attorney, Agent, or Firm*—Barnes & Thornburg LLP

(57) ABSTRACT

There is a need to provide a method of managing contacts in a network of contact centers which facilitates even distribution of work load across the contact centers, is flexible, has inherent resilience, and which enables each contact center to have a degree of autonomy. This is achieved in the present invention by using contact objects and agent objects at each contact center and replicating and synchronizing those objects from each contact center to each of the other contact centers.

13 Claims, 4 Drawing Sheets

MANAGEMENT OF CONTACTS IN A NETWORK OF CONTACT CENTERS

FIELD OF THE INVENTION

The present invention relates to the management of contacts in a network of contact centers.

BACKGROUND TO THE INVENTION

When two or more contact centers are present on a communications network it is possible to transfer/route contacts between these contact centers. This provides a better service for the customer or end user because the overall contact center resources are increased; waiting times are reduced because there are more agents overall and the range of agents with different skills is increased so that customers are more readily able to reach an agent with appropriate skills and abilities. However, the task of managing contracts in such a network of contact centers is increased in complexity as compared to the situation for a single contact center.

One such management problem is how to ensure work load is evenly distributed through the networked contact centers. Another problem concerns how to deal quickly and effectively with fault situations where there is a problem in the network or at one of the contact centers. At the same time there is a need to enable individual contact centers in the network to decide either to partake in network routing or to switch into a mode whereby only contacts received directly at that contact center are dealt with. In addition it is required that the decision to partake in network-routing be made on a contact-by-contact basis.

One of the current conventional approaches to managing contacts in a network of contact centers is described in U.S. Pat. No. 5,878,130 assigned to Geotel Communications Corp. This uses a central controller which controls distribution of all calls, irrespective of which contact center the incoming call was placed to by the caller. The central controller receives statistical information from each contact center and uses this to determine a "most available" contact center. Incoming calls arriving at the central controller are then directed to the currently "most available" contact center. A problem with this approach is that it does not consider individual agent availability. That is, no network routing is proposed after the initial network-level route. When an agent becomes available, there is no additional step which selects the longest waiting (or most suitable according to some metric) contact from the pool of contacts waiting across the network. Additionally, after transfer of a call to the "most available" contact center it may be that all suitable agents are busy with only agents with less suitable skills free, since the statistical information received from each nodal contact center can never be completely up to date. Another problem with this approach is that it does not guarantee or ensure even workload distribution between the contact centers. This is a particular problem when agents are only idle for very short times. Also, it is difficult using this method to allow individual contact centers to have some degree of autonomy because the central controller is responsible for directing all contacts.

In addition, this type of system using a central controller is very sensitive to failure at the central controller itself. A queue of contacts is maintained at the central controller as mentioned above and if this is lost due to a fault at or near that node it is complex and time consuming to rebuild the queue. In U.S. Pat. No. 5,878,130 this is addressed by using two central controllers one mirroring the other such that in the event of failure at one controller the other can take over. However this is expensive and requires data mirroring between the two controllers which need to be geographically separated to minimize the risk of both being affected by fault.

An alternative approach is for the central controller to directly monitor the activity of each agent, by receiving reports from each contact center. This enables individual agent availability to be taken into account. However, this method is still very sensitive to any failure or problem at the central controller. Should this fail then the entire queue needs to be rebuilt from scratch when service has been restored. In networked multimedia contact centers, there may be thousands of agents and millions of queued contacts at any given time, so rebuilding the queue takes considerable time and resources.

It is also possible for each contact center to maintain its own queue and deal with its own received contacts. Only when there is a shortage of resources is a contact routed to another node with spare capacity. This approach has the disadvantage that contacts are not evenly distributed through the network, and inefficiencies such as over and under staffing can occur at different times of the day at individual contact centers when in fact the network as a whole might be able to handle the aggregate contacts more efficiently.

OBJECT TO THE INVENTION

The invention seeks to provide a method and apparatus for managing contacts in a network of contact centers which overcomes or at least mitigates one or more of the problems mentioned above.

Further benefits and advantages of the invention will become apparent from a consideration of the following detailed description given with reference to the accompanying drawings, which specify and show preferred embodiments of the invention.

SUMMARY OF THE INVENTION

According to an aspect of the present invention there is provided a network comprising a plurality of contact centers each contact center comprising:
  a contact object memory storing a plurality of contact objects each representing a different contact in the network of contact centers; and
  an agent object memory storing a plurality of agent objects each representing a different agent in the network of contact centers;
  said contact objects and agent objects being replicated and synchronized at each of the contact centers.

This provides the advantage that each contact center has complete and up to date information about all contacts and agents in the network. This information is then used to allocate contacts to agents and vice versa where the agents and contacts can be at any contact center in the network. By using the contact objects and agent objects a simple and effective way of managing the complex network is achieved.

Preferably each of said contact centers is arranged to receive incoming contacts directly at that contact center. This avoids the need for any dedicated network node for receiving all incoming contacts and distributing those amongst the contact centers. This enables a robust system to be provided that can cope with failures in the network and at individual contact centers.

Preferably at least one of said contact centers is arranged to operate in a first mode and a second mode; whereby in said first mode at least some incoming contacts received directly at that contact center are serviced only by said contact center;

and whereby in said second mode at least some incoming contacts received directly at that contact center are serviced at any suitable contact center in the network. This means that an individual contact center in the network has a degree of autonomy. It is able to operate either on a stand alone basis or a network-wide basis as the need arises. There is also the ability to operate in both modes simultaneously with the mode being selected on a per contact basis.

In one embodiment each of the contact centers further comprises a processor arranged to access the contact objects and the agent objects stored at that contact center in order to allocate a contact to the most suitable agent network-wide. For example, the most suitable agent network-wide could be the network longest-idle agent. In this way even distribution of work load over the network of agents staffing the contact centers is achieved. Idle in this case could mean idle with respect to capacity, where an agent is configured to be capable of handling N contacts simultaneously and is currently handling less than N contacts. Additionally, the agent may indicate manually that he/she has spare capacity (e.g. while involved in a text-chat session with a particular slow-typing customer the agent may specify that he/she can handle another chat session).

According to another aspect of the present invention there is provided a contact center for use in a network of contact centers, said contact center comprising:

a contact object memory storing a plurality of contact objects each representing a different contact in the network of contact centers; and an agent object memory storing a plurality of agent objects each representing a different agent in the network of contact centers;

said contact objects and agent objects being replicated and synchronized with those at each of the other contact centers.

According to another aspect of the present invention there is provided a method of managing a contact in a network of contact centers said method comprising:

at a first contact center in the network storing a plurality of contact objects each representing a different contact in the network of contact centers; and at said first contact center storing a plurality of agent objects each representing a different agent in the network of contact centers; and replicating and synchronizing said contact objects and agent objects at each of the contact centers in the network.

The invention also encompasses a method of operating a contact center in a network of contact centers, said method comprising the steps of:

at said contact center storing a plurality of contact objects each representing a different contact in the network of contact centers;

at said contact center storing a plurality of agent objects each representing a different agent in the network of contact centers;

said contact objects and agent objects being replicated and synchronized with those at each of the other contact centers.

The invention also encompasses computer programs arranged to carry out the methods described above.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which.

DETAILED DESCRIPTION OF INVENTION

Figure 1:
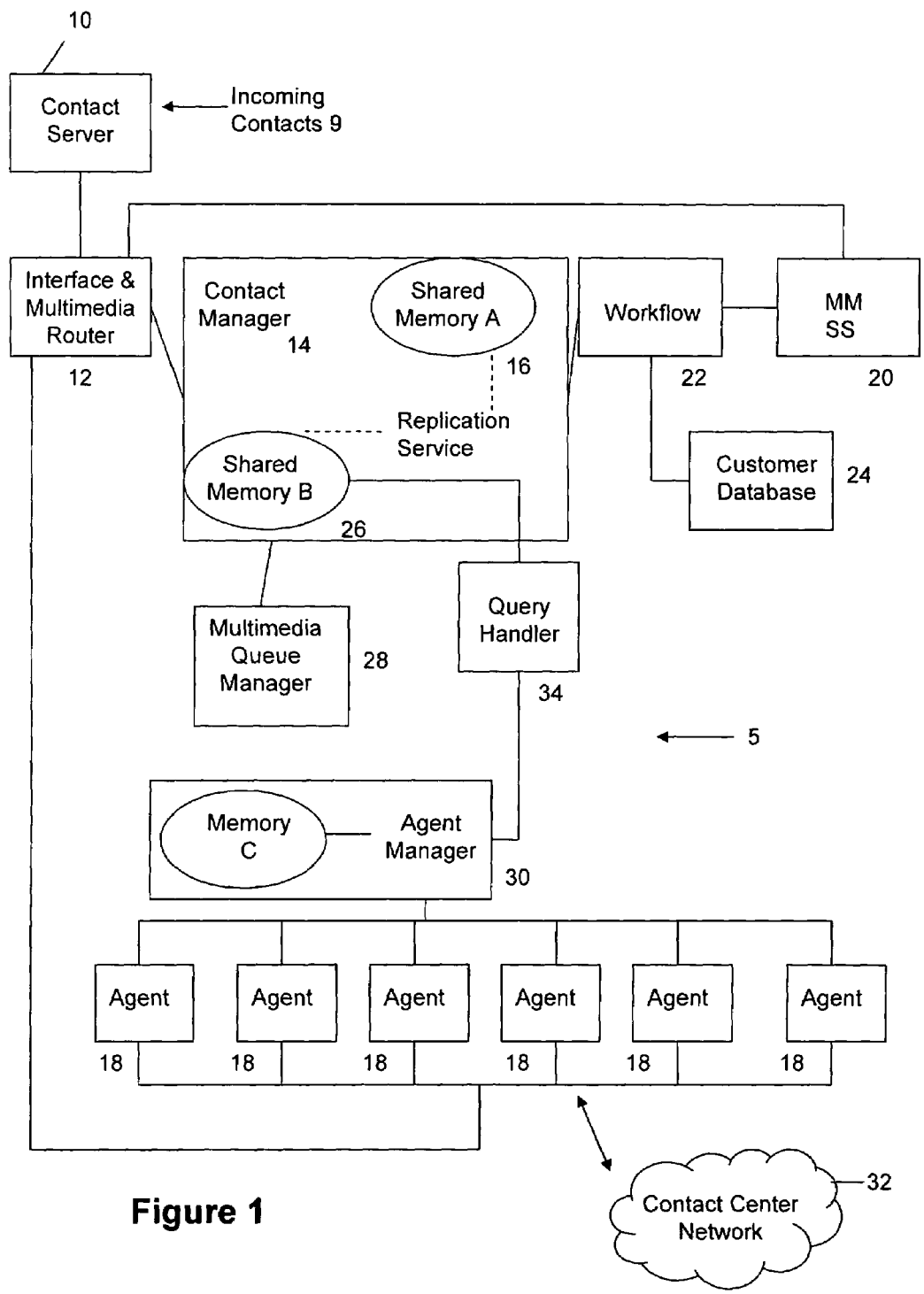
FIG. 1 is a schematic diagram of a contact center using contact and agent objects.

Embodiments of the present invention are described below by way of example only. These examples represent the best ways of putting the invention into practice that are currently known to the Applicant although they are not the only ways in which this could be achieved.

As mentioned above there is a need to provide a method of managing contacts in a network of contact centers which facilitates even distribution of work load across the contact centers, is flexible, has inherent resilience, and which enables each contact center to have a degree of autonomy. This is achieved in the present invention by using contact objects and agent objects at each contact center and replicating and synchronizing those objects from each contact center to each of the other contact centers. This provides complete and up to date information at each node about all contacts and agents in the network. This information is then used to ensure even distribution of work load. Also there is no central controller with a centralized queue. Thus if there is a fault at one contact center the other contact centers are able to carry on and service all the pending contacts without the need to rebuild any central queue. It is also simple for individual contact centers to "opt out" of the network wide process and service only local contacts received directly from customers. This provides a degree of autonomy for the individual contact centers.

The applicant's earlier U.S. patent application Ser. No. 10/645,438; filed Aug. 21, 2003 describes the use of contact objects at contact centers in a network and the whole contents of that application are incorporated herein by reference. In that application a central network queue manager is described. When an agent becomes available at one of the contact centers the network queue manager is informed. It then requests each contact center for its best pending contact to match that agent. The network queue manager then decides which contact should be assigned to the agent and sends instructions to effect this. The network queue manager does not itself maintain any queues. Thus in the event of a failure of the network connection to any contact center, then that center can continue to operate locally and the remaining contact centers operate together as before. If the network queue manager itself fails, then each center can operate independently without any setback. As soon as the network queue manager is again available, it benefits from the fact that it is stateless and can immediately resume routing contacts to agents without any need to rebuild queues. Whilst this system is completely workable and practical the present invention builds on and extends the work described in U.S. Ser. No. 10/645,438.

As mentioned above, in the present invention, contact objects and agent objects at each contact center are replicated and synchronized at each other contact center in the network.

This removes the need for a central network queue manager. The term "replicated" is used here to indicate that the objects are copied such that they comprise all the same information at each contact center. The term "synchronized" is used to indicate that the objects are continually updated so that not only do they comprise the same information but that information is up to date.

The term "contact object" is used to refer to a collection of information in a pre-specified format used to represent a contact present in the network of contact centers.

The term "agent object" is used to refer to a collection of information in a pre-specified format used to represent an agent present in the network of contact centers.

In FIG. 1 the main components or processes of a contact center 5 as they relate to the present invention are shown. Such additional conventional details of a contact centre as are required for a complete architecture are well known to the skilled person.

Incoming contacts 9 are received at a contact server 10 which is of any suitable type as known in the art for dealing with contacts of particular media types.

The contact server 10 holds each incoming contact while details of the contact (such as the port on which it is held and the origin of the contact, e.g. the calling line ID or the IP address of the calling terminal) are passed to an interface and multimedia router 12. The multimedia router notifies the details of the contact to a contact manager 14 which generates a software object containing the details of the contact in a shared memory area 16 (Memory Area "A"). For example, as illustrated in FIG. 1 the contact manager encompasses shared memory areas A and B.

The multimedia router 12 is adapted to generate commands to the contact server to cause the contacts to be routed to whichever location has been identified for the contact (such as an agent 18 of the call centre or another contact centre forming part of a common network 32 of contact centers). The multimedia router 12, as its name implies, handles different media types of contact.

The contact center also comprises a workflow process manager 22. The function of the workflow process manager 22 is to assist in determining a priority for each contact and/or a skillset required to deal with each contact. A skillset, also referred to as a work group, comprises one or more specified criteria to be met by contact center agents. For example, all contact center agents trained to deal with sales enquiries relating to products A and B may be assigned to skillset "sales" whereas agents trained to deal with support queries may be assigned to skillset "support". Agents can be members of more than one skillset if appropriate and a network skillset includes agents at more than one networked contact center.

The workflow process manager 22 is optionally connected to a customer database 24 and a (multimedia self-service system ((MMSS, (IVR in the case of voice))) 20. Information from those components 20, 24 is optionally used by the workflow process manager 22 in its priority and/or skillset determination.

The contact manager is designed to manage a queue of contacts (or more specifically, software objects representing contacts). The contact manager has the ability to create, update or delete contact objects. Both the workflow process manager 22 and the multimedia router 12 are typically embodied in software running on a computer having a suitable interface to enable communication with other components of the system. They can be run on the same computer or on different computers, and it will be appreciated that the details of the implementation are not critical to the principles of operation of the system. These components (as well as those described below in functional terms) could equally be embodied in dedicated hardware in which the program instructions are hardwired in an electronic circuit.

Once an incoming contact has been received and a contact object created for that incoming contact in the Contact Manager 14, the workflow process manager 22 obtains any inputs from the MMSS 20 and customer database 24 as appropriate. The workflow process manager 22 locates the object in the Contact Manager corresponding to the contact (identifiable by the details of the contact held in the object) and updates the object. It either updates the object itself or instructs the contact manager to do so.

Typically, the object is updated by adding a set of data based on any outputs from the MMSS system 20, and based on customer details accessible from the customer details database 24 (if the identity of the customer can be determined from e.g. the calling line ID or information input by the customer during the MMSS session), and these data are effective to act as a set of commands to a multimedia queue (MMQ) manager 28 to enable the MMQ manager to determine a priority rating for the call and to identify the skillsets required for an agent to deal with the call, as will be described below.

As shown in FIG. 1 the MMQ manager 28 is connected to the contact manager 14, which as mentioned above incorporates shared memory, Memory B 26. Memory B is arranged to store the same contact objects as Memory A 16 as described in more detail below.

The mechanism whereby the MMQ manager 28 and the workflow process manager 22 each access the shared memory area and update contacts therein is at the choice of the system designer. For example, the shared memory may be a memory area in a memory of a computer in which both the MMQ manager 28 and the workflow manager 22 are running. Alternatively, the memory area can be duplicated in two locations, i.e. at the MMQ manager 28 and the workflow manager 22, and a replication service running in each location can notify its counterpart to update an object with any changes made locally (as illustrated in FIG. 1). In this way, the two physically distinct memory areas A and B can together form a unified virtual memory area which is accessible by both processes (workflow 22 and MMQ manager 28). Preferably, shared memory areas A and B are synchronized, leading to the situation where a contact created/updated in A is automatically created/updated in B (and vice versa).

As mentioned above, the workflow process manager 22 updates the contact object in Memory A corresponding to the contact being processed. These updates are also made to the corresponding contact object in Memory B as a result of the synchronization between Memory A and memory B.

The MMQ manager 28 has access to Memory B and is arranged to convert the workflow output, which it reads from each contact object in Memory B, into queuing commands.

It does this by assigning one or more skillset identifiers to the contact based on the information collected in the workflow process (and according to locally adjustable rules which take account of the skillsets maintained in that contact centre) and by assigning a priority rating based on the identity of the customer and the skillset determinations, in known manner. For example, contacts received from particular numbers or made to restricted access numbers might get higher or lower priorities, and contacts including a "sales" skillset might be rated higher than those which do not include that skillset. The management personnel of the contact centre can vary the priority ratings and skillset determinations to take account of locally varying factors.

The MMQ updates the contact object with the priority and skillset identifiers and this then allows the contact manager 14 to "queue" the object with reference to other waiting contacts (or more accurately, the objects corresponding to other waiting contacts). The contact manager does not maintain a queue in the traditional sense, in which a list of contact identifiers is maintained. Instead it provides each object with information about the contact immediately ahead and/or behind it in the queue so that each object "knows" its place in the queue and the contact manager does not need to keep track of a list of objects. Thus the contact manager 14 reads the priority and skillset information and from this determines which object(s) are immediately ahead and/or behind it in the queue, and the relevant objects are then updated to refer to one another.

As shown in FIG. 1 the contact center also comprises an agent manager 30 encapsulating memory area C. The agent manager 30 has access to a plurality of agents 18 at agent stations. The agent manager is similar to the contact manager 14 in that it does not maintain a queue of available agents 18 in the traditional sense. Memory area C stores a plurality of agent objects, each agent object representing one of the contact center agents 18. The agent manager is able to update, delete or create agent objects in Memory C as appropriate. It is also able to provide each agent object with information about the agent contact immediately ahead or behind it in the queue so that each object "knows" its place in the queue and the agent manager does not need to keep track of a list of objects.

Details of how the local queues at memory areas A, B and C are established and updated and are described in our earlier U.S. patent application Ser. No. 10/645,438 mentioned above.

The agent manager 30 monitors the activities of each agent 18 in known manner and generates event reports as the status of each agent changes (such as an agent logging on/off, an agent becoming engaged in a call or an agent becoming free after a call).

These event reports are used by the agent manager 30 to update the agent objects and thus any agent queues in Memory C.

As shown in FIG. 1 a query handler 34 (this feature is traditionally met by Multimedia queue manager (may be sufficient to say that both tasks can be combined) is provided in the contact center and has access to Memory B and the agent manager 30 or Memory C. The query handler 34 is preferably provided as part of the MMQ manager 28.

The query hander 34 acts to match suitable agent objects and contact objects. For example, the query handler locates a contact object at the top of a queue and finds an appropriate agent object. The query handler then updates the contact object with the details of the agent concerned. The contact object is passed to the multimedia router 12 which transfers the corresponding contact to the agent identified in the contact object. The contact manager 14 then deletes the contact object from the top of the queue and updates that queue. The agent manager 30 also updates the agent object accordingly.

In the present invention a plurality of contact centers such as that illustrated in FIG. 1 are connected together in a communications network. In addition, the contact and agent objects of each individual contact center are replicated and synchronized at each other contact center.

Thus in FIG. 1, Memory A and Memory B comprise contact objects for the local contact center as well as for each other contact center in the network. Also, Memory C comprises agent objects for the local contact center as well as for each other contact center in the network.

Figure 2:
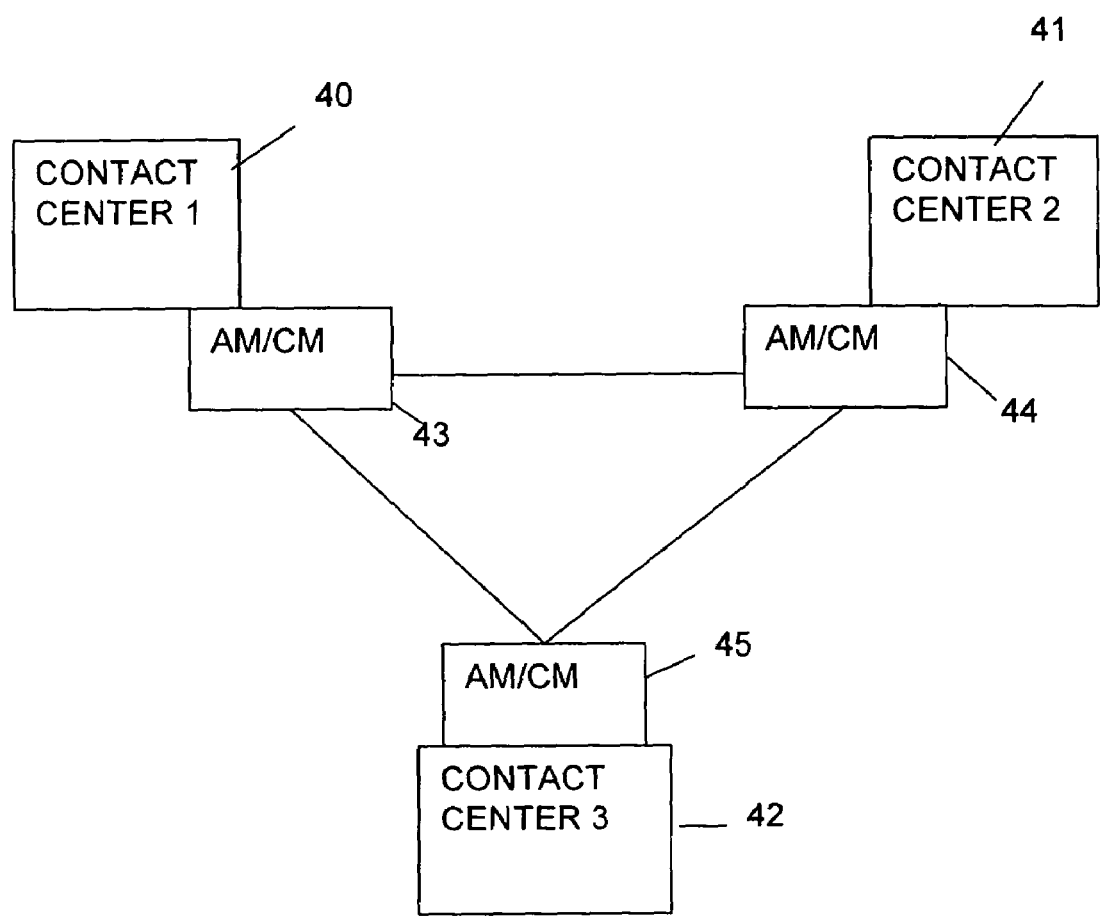
FIG. 2 is a schematic diagram of a plurality of contact centers networked together.

FIG. 2 is a schematic diagram of three contact centers 40, 41, 42 networked together and each having agent objects and contact objects associated with an agent manager (AM) and contact manager (CM) 43, 44, 45 at each contact center. Through the use of distributed, virtual memory the objects maintained by the agent manager and contact manager components 43, 44, 45 are synchronized with each other network-wide.

Each contact center 40, 41, 42 can separately receive inbound contacts and service those independently as previously possible outside a network of contact centers. When an individual contact center determines that network-wide resources should be used it, for example, carries out the method now described with reference to FIG. 3. This method ensures even distribution of work load network wide because it uses "longest idle agent routing". It is also possible for individual contact centers to process some incoming contacts only at that contact center and others on a network-wide basis. This decision can be made on a per contact basis and can even be changed. For example, a contact can be queued locally for a period of time and then, if not serviced, processed using network-wide resources.

Figure 3:
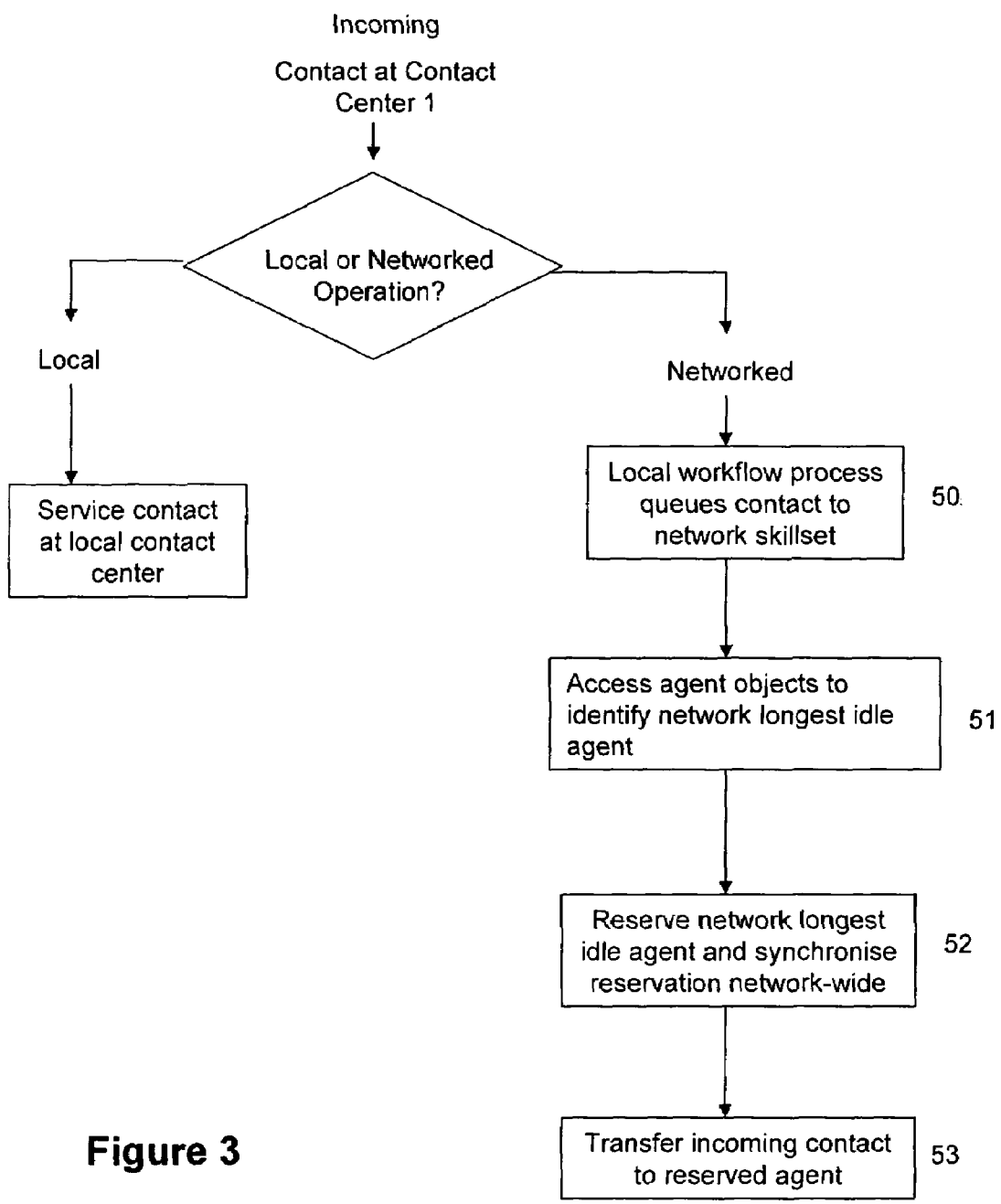
FIG. 3 is a flow diagram of a method of managing a contact received at one of the contact centers of FIG. 2.

A workflow process 22 (FIG. 1) on contact center 1 (FIG. 2) queues the incoming contact to one or more network skillsets (box 50 of FIG. 3). A queuing component (such as the query handler 34, FIG. 1) on contact center 1 then accesses the agent objects associated with its local version of the agent manager (30 FIG. 1). These agent objects are analyzed to determine the network longest idle agent, that is, the longest idle agent in the network (box 51 of FIG. 3). The agent objects are preferably organized in such a manner that the queuing component does not have to search through data, but must merely perform a read operation on pre-computed data. This is achieved by pre-arranging, linking or indexing agent objects according to various factors such as priority or time-in-queue. Once the network longest idle agent is determined the queuing component on contact center 1 reserves that agent for the contact concerned (by updating the contact and/or agent object). Suppose that the network longest idle agent is located at contact center 2 in FIG. 2. The reservation command is synchronized from contact center 1 to the agent manager at contact center 2. (Box 50 of FIG. 3.) The contact is then routed from contact center 1 to contact center 2 and presented to the agent using any suitable techniques as known in the art. (Box 53 of FIG. 3.)

Incoming contacts are received directly at the individual contact centers 40, 41, 42 and it is possible that incoming contacts at different contact centers may compete for the same agent. In order to prevent the same agent being reserved for competing contacts a distributed transaction or other concurrency control mechanism is employed during the process of selecting an agent and reserving that agent.

Figure 4:
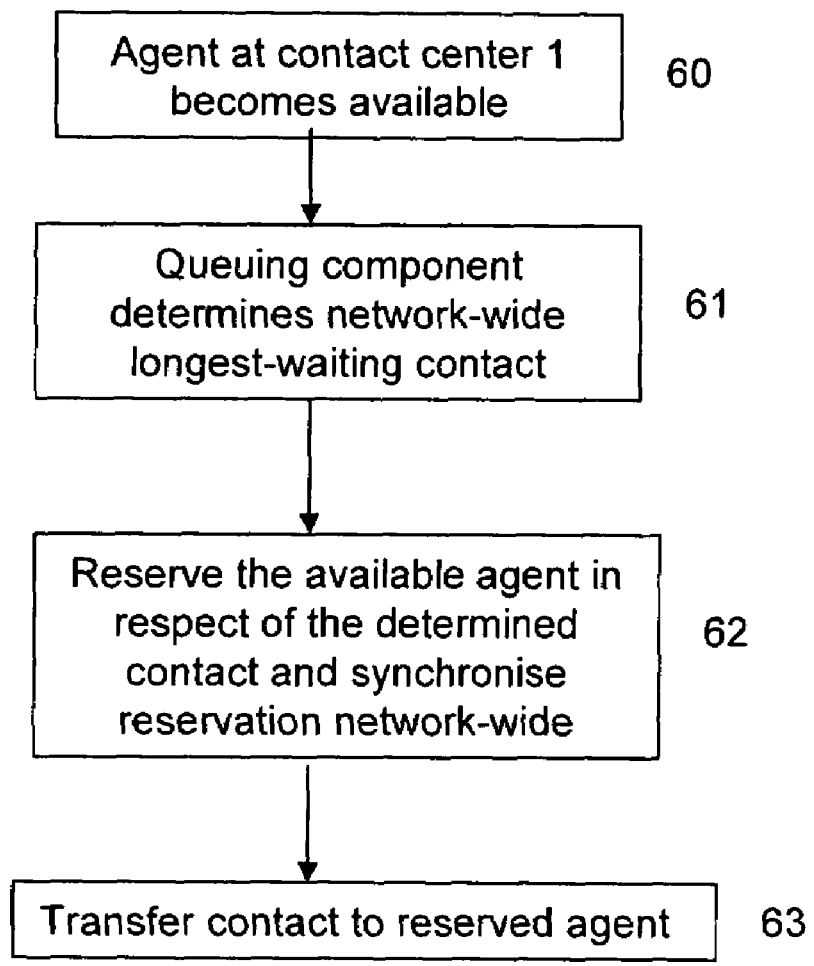
FIG. 4 is a flow diagram of a method managing an agent who becomes available at one of the contact centers of FIG. 2.

In the situation where an agent 18 (FIG. 1) becomes available to take a waiting contact a method such as that now described with reference to FIG. 4 is carried out.

An agent at contact center 1 becomes available (box 60 of FIG. 4). This happens if an agent becomes idle or if an agent who has capacity to handle say three simultaneous contacts is now only handling two contacts. Next, a queuing component at contact center 1 determines the longest waiting contact network-wide (box 61 of FIG. 4). This is achieved by analyzing the contact objects at contact center 1. This analysis takes into account the skills defined for the available agent. That is, the longest-waiting contact requiring the skills of the available agent is chosen. Preferably the contact objects are organized in a manner such that the queuing component does not have to 'search' through data, but must merely perform a read operation on pre-computed data. This is achieved in any suitable manner as for the agent objects described above with reference to FIG. 2.

Once the network-wide longest-waiting contact is found the queuing component at contact center 1 reserves the agent for that contact (see box 62 of FIG. 4). Supposing that the contact is found at contact center 2 the reservation command is synchronized throughout the network of contact centers such that it takes effect at contact center 2. Contact center 2 then proceeds to route the selected contact to the reserved agent at contact center 1 (see box 63 of FIG. 4). Again a distributed transaction or other concurrency control mechanism is used as described above with reference to FIG. 3.

The invention claimed is:

1. A network comprising a plurality of contact centers each contact center comprising:
   (i) a contact object memory storing a plurality of contact objects each representing a different contact in the network of contact centers; and
   (ii) an agent object memory storing a plurality of agent objects each representing a different agent in the network of contact centers, each of said plurality of agent objects comprising information representing a respective agent and its availability status;
   said plurality of contact centers being arranged to replicate and synchronize said contact objects and agent objects at each of the plurality of contact centers whereby the network comprising said plurality of contact centers does not require a central controller and said plurality of contact centers is further arranged such that, if there a fault or a change of mode of operation at one of said plurality of contact centers, remaining ones of said plurality of contact centers continue to replicate and synchronize said contact objects and agent objects at each of said remaining ones of the plurality of contact centers.

2. A network as claimed in claim 1 wherein each of said contact centers is arranged to receive incoming contacts directly at that contact center.

3. A network as claimed in claim 1 wherein at least one of said contact centers is arranged to operate in a first mode and a second mode; whereby in said first mode at least some incoming contacts received directly at that contact center are serviced only by said contact center; and whereby in said second mode at least some incoming contacts received directly at that contact center are serviced at any suitable contact center in the network.

4. A network as claimed in claim 1 wherein each of the contact centers further comprises a processor arranged to access the contact objects and the agent objects stored at that contact center in order to allocate a contact to the most suitable agent network-wide.

5. A network as claimed in claim 1 wherein said most suitable agent network-wide is a network longest-idle agent.

6. A network as claimed in claim 1 wherein each of the contact centers further comprises a processor arranged to access the contact objects and the agent objects stored at that contact center such that when an agent becomes available at that contact center a contact is selected for that agent network-wide.

7. A contact center for use in a network of contact centers, said contact center comprising:
   a) a contact object memory storing a plurality of contact objects each representing a different contact in the network of contact centers; and
   b) an agent object memory storing a plurality of agent objects each representing a different agent in the network of contact centers, each of said plurality of agent objects comprising information representing a respective agent and its availability status;
   c) means for notifying changes in any of said contact objects and agent objects to other contact centers in the network of contact centers to thereby replicate and synchronize said contact objects and agent objects with those at each of the other contact centers; and
   d) means arranged such that, if there a fault or a change of mode of operation at another contact center of said network of contact centers, the contact center is arranged to continue to replicate and synchronize said contact objects and agent objects with those at each of the other contact centers save for the another contact center.

8. A method of managing a contact in a network of contact centers said method comprising:
   (i) at each contact center in the network storing a plurality of contact objects each representing a different contact in the network of contact centers; and
   (ii) at said each contact center storing a plurality of agent objects each representing a different agent in the network of contact centers, each of said plurality of agent objects comprising information representing a respective agent and its availability status;
   (iii) at said each contact center, notifying all other contact centers of any changes in contact objects and agent objects stored at said contact center to thereby replicate and synchronize said contact objects and agent objects at each of the contact centers in the network; and,
   (iv) if there a fault or a change of mode of operation at one of said contact centers, continuing to replicate and synchronize said contact objects and agent objects at each of remaining ones of said contact centers.

9. A method as claimed in claim 8 which further comprises receiving an incoming contact directly at any of said contact centers in the network.

10. A method as claimed in claim 8 which comprises operating each contact center in a first mode and a second mode; whereby in said first mode at least some incoming contacts received directly at that contact center are serviced only by said contact center; and whereby in said second mode at least some incoming contacts received directly at that contact center are serviced at any suitable contact center in the network.

11. A method as claimed in claim 8 which further comprises using a processor at any of the contact centers to access the contact objects and the agent objects stored at that contact center in order to allocate a contact to the most suitable agent network-wide.

12. A method as claimed in claim 8 which further comprises using a processor at any of the contact centers to access the contact objects and the agent objects stored at that contact center such that when an agent becomes available at that contact center a contact is selected for that agent network-wide.

13. A method of operating a contact center in a network of contact centers, said method comprising the steps of
   (i) at said contact center storing a plurality of contact objects each representing a different contact in the network of contact centers;
   (ii) at said contact center storing a plurality of agent objects each representing a different agent in the network of contact centers, each of said plurality of agent objects comprising information representing a respective agent and its availability status;
   (iii) notifying all other contact centers in said network of contact centers of any changes in said contact objects and agent objects to thereby replicate and synchronize said contact objects and agent objects with those at each of the other contact centers; and, (iv) if there a fault or a change of mode of operation at another contact center of said network of contact centers, continuing to replicate and synchronize said contact objects and agent objects with those at the contact center and each of the other contact centers save for the another contact center.

* * * * *